United States Patent
Hatano et al.

(10) Patent No.: US 6,824,888 B2
(45) Date of Patent: Nov. 30, 2004

(54) BONDED BODY COMPRISING BERYLLIUM MEMBER AND COPPER OR COPPER ALLOY MEMBER, AND METHOD OF MANUFACTURING THE SAME

(75) Inventors: Toshihisa Hatano, Tokai-Mura (JP); Takaharu Iwadachi, Handa (JP); Minoru Uda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/971,355

(22) Filed: Oct. 4, 2001

(65) Prior Publication Data

US 2003/0085260 A1 May 8, 2003

(51) Int. Cl.⁷ .......................... B32B 15/00; B32B 15/04; B32B 15/20
(52) U.S. Cl. ....................... 428/610; 428/650; 428/658; 428/649; 428/660; 428/674; 428/663; 428/675; 428/333; 428/334; 428/336
(58) Field of Search ................. 428/610, 650, 428/651, 652, 649, 658, 660, 674, 663, 675, 666, 334, 335, 336, 941

(56) References Cited

U.S. PATENT DOCUMENTS

| | | | | |
|---|---|---|---|---|
| 5,895,533 A | * | 4/1999 | Kawamura et al. | 148/516 |
| 6,164,524 A | * | 12/2000 | Iwadachi | 228/193 |
| 6,176,418 B1 | | 1/2001 | Iwudachi | 228/193 |
| 6,286,750 B1 | * | 9/2001 | Iwadachi | 228/118 |

FOREIGN PATENT DOCUMENTS

| | | |
|---|---|---|
| EP | 0 104 711 | 4/1984 |
| EP | 0 856 374 A1 | 8/1998 |
| GB | 1 053 456 | 1/1967 |
| JP | 07120600 | 12/1995 |
| JP | 10-211572 | 8/1998 |

OTHER PUBLICATIONS

T. Kuroda et al: "Development of joining technology for BE/Cu–alloy and Be/SS by HIP" Journal of Nuclear Materials (Conf. Prof. ICFRM–8, Sendai JP, Oct. 26–31, 1997), vol. 258–264, IX002103696 Amsterdam.

M. Araki et al: "Manufacturing and testing of a BE/OFHC–Cu divertor module" Journal of Nuclear Materials (Conf. Prof. ICFRM–7, Obninsk RU, Sep. 25–29, 1995), vol. 233–237, No. Part A, 1996 pp. 632–637, XP002103697.

Ben C. Odegard Jr. et al., "Beryllium–Copper Diffusion Bonding for an ITER First Wall Application," Fusion Engineering, 1997, 17th IEEE/NPSS Symposium San Diego, CA, Oct. 6–10, 1997, pp 896–900.

C.H. Cadden et al., "Aluminum–assisted Joining Beryllium to Copper for Fusion Applications," Fusion Engineering and Design, Elsevier Science Publishers, Amsterdam, NL, vol. 37, Nr. 2, pp. 287–298 (1997), no month.

* cited by examiner

*Primary Examiner*—Michael La Villa
(74) *Attorney, Agent, or Firm*—Burr & Brown

(57) ABSTRACT

The present invention provides a method of producing a bonded body of a beryllium member and a copper or copper alloy member, in which the bonding strength and thermal cycle resistance property are further increased. When the beryllium member and the copper or copper alloy member are bonded to each other, a thin layer of titanium, chromium, molybdenum, or silicon is formed as a diffusion inhibition layer on the surface of the beryllium; a copper layer is formed as a bonding layer on the surface of the diffusion inhibition layer; a thin layer of aluminum or zinc is formed as a bonding promotion layer on the surface of the bonding layer; and the beryllium member and the copper or copper alloy member are diffusion bonded to each other with the intermediate layer formation side being the bonding surface.

7 Claims, 1 Drawing Sheet

BONDED BODY COMPRISING BERYLLIUM MEMBER AND COPPER OR COPPER ALLOY MEMBER, AND METHOD OF MANUFACTURING THE SAME

BACKGROUND ART

1. Technical Field

The present invention relates to a bonded body of a beryllium member and a copper or copper alloy member, and a method of producing the same. More particularly, it relates to the bonded body and method capable of increasing the bonding strength and further improving the bonding reliability against thermal load.

2. Prior Art

In recent years, as an armor material used for a first wall of a nuclear fusion reactor, beryllium, which has a small atomic number and a relatively high melting point and is effective as a getter for oxygen etc., has attracted interest. Since this first wall is subjected to a high thermal load applied by plasma generated in the nuclear fusion reactor, there have been proposed various structures for effectively cooling an armor material (beryllium etc.) by bonding a member formed of the armor material, located on the outermost surface of the first wall, to a member formed of copper or copper alloy having a cooling structure.

As a method for bonding a beryllium member to a copper or copper alloy member to produce these structures, a brazing process, diffusion bonding process, thermal spraying process, hot isostatically pressing (HIP) process, and the like processes have been proposed. Among these bonding processes, the HIP process is anticipated as a method of bonding the beryllium member to the copper or copper alloy member because the bonded surfaces are brought into close contact with and bonded to each other even when the bonded surface has a three-dimensional shape.

Conventionally, in order to HIP-bond the beryllium member to the copper or copper alloy member, it has been necessary to raise the heating temperature to a high temperature not lower than 700° C. The reason for this is that since an oxide film usually exists on the surface of the beryllium member, the bonding due to mutual diffusion of beryllium and copper cannot be effected unless the beryllium member is heated to a temperature not lower than 700° C. In this method, however, a brittle intermetallic compound (for example, $Be_2Cu$ or BeCu) is easily formed at the interface between beryllium and copper alloy, so that separation sometimes occurs at the interface due to thermal cycle. Also, there remains a problem in that the treatment at a high temperature not lower than 700° C. is remarkably disadvantageous in terms of energy and cost.

In this respect, if a film of pure copper is formed on the purified surface by ion plating etc. after oxides on the surface of beryllium member are removed under vacuum, since no oxides exist at the interface between pure copper and beryllium, the beryllium member can be bonded strongly to the copper alloy member even at a low temperature in the range of 400 to 550° C. when the beryllium member is HIP-bonded to the copper alloy member. In this case, an intermetallic compound is not formed excessively at the interface between beryllium and pure copper. However, even if the bonding is performed as described above, when the temperature at the time when the bonded body is used becomes 400° C. or higher, a brittle intermetallic compound of beryllium and copper is yielded excessively at the interface at which an intermetallic compound scarcely existed at the time of bonding, and thus there is a fear that a fracture occurs at the interface.

As a solution to the above problem, it may be possible to provide a soft metal that does not form an intermetallic compound with beryllium, for example, an aluminum layer adjacently to the beryllium member. On the other hand, however, when an aluminum layer is bonded adjacently to the copper alloy, a brittle compound of aluminum and copper is formed at the interface between the beryllium member and the copper alloy member, so that satisfactory bonding cannot be performed. In this case, therefore, it is important to provide an Al—Cu diffusion inhibition layer formed of titanium etc. at the interface between the aluminum layer and the copper alloy member. Specifically it is necessary that an intermediate layer of aluminum be provided in advance on the beryllium member side, and an intermediate layer of titanium be provided in advance on the copper alloy member side.

However, even if an intermediate layer of aluminum, titanium, etc. is provided in advance on each of the beryllium member and the copper alloy member, it is difficult to obtain a strongly bonded state because aluminum and titanium have high activity and the surface thereof is easily oxidized. In particular, since metallic foil has conventionally been used as means for forming the intermediate layer, it cannot practically be desired to obtain a strongly bonded state because of an oxide film on the surface thereof. Also, in the method in which metallic foil of aluminum etc. is used as an insert material, dislocation of the beryllium member and the copper alloy member occurs when the method is applied to a member having an intricate construction. Further, when this method is used in combination with titanium foil, copper foil, etc., dislocation or wrinkle occurs. Therefore, reliable bonding cannot be performed likewise.

In this respect, as a solution to the above problems, the inventors have proposed a method of producing a HIP-bonded body of beryllium and copper alloy in U.S. Pat. No. 6,164,524. In this method, basically, when a beryllium member and a copper alloy member are bonded to each other, a thin layer of titanium, chromium, molybdenum or silicon is formed as a diffusion inhibition layer for beryllium and copper by the PVD or thermal spraying process, and successively a pure copper layer or a pure nickel layer is formed as a bonding promotion layer on the surface of the diffusion inhibition layer. Subsequently, the beryllium member and the copper alloy member are HIP-bonded with the intermediate layer formation side being the bonding surface.

The art disclosed in the aforementioned U.S. Pat. No. 6,164,524 is based on the following knowledge.

(a) From the viewpoint of stress relaxation at the interface, it has conventionally been thought that the diffusion inhibition layer for beryllium and copper must be a soft metal such as aluminum. However, even a hard metal such as chromium and molybdenum sufficiently functions as a Be—Cu diffusion inhibition layer if the film thickness thereof is small.

(b) Nevertheless, in the case where a hard thin film of chromium etc. is formed on the beryllium member, if an oxide film exists on the surface of beryllium, a sufficient bonding strength cannot be obtained. Therefore, when a hard metal film is formed, it is necessary to remove the oxide film from the surface of beryllium.

(c) By the above-described configuration, a bonded body having high bonding strength and thermal cycle resistance property can be obtained. However, when an excessive thermal load is applied repeatedly, such a configuration cannot be said to be sufficient. To withstand such a thermal load, the thickness of the aluminum layer serving as a stress relaxation layer must be increased.

By the above-described art, a bonded body having high bonding strength and thermal cycle resistance property can be obtained. Recently, however, to further increase the reliability, it is demanded to further increase the bonding strength and thermal cycle resistance property.

SUMMARY OF THE INVENTION

The present invention advantageously meets the above-described demands, and an object thereof is to provide a bonded body of a beryllium member and a copper or copper alloy member, which has further improved bonding strength and thermal cycle resistance property as compared with the art disclosed in U.S. Pat. No. 6,164,524, and an advantageous method of producing the same.

The inventors carried out studies earnestly to achieve the above object; and obtained the following knowledge.

(a) In the art disclosed in U.S. Pat. No. 6,164,524, a pure copper layer is used as the final bonding surface on the beryllium member side. However, it is advantageous to provide a thin layer of aluminum or zinc, which is an element that forms a solid solution with copper, on the pure copper layer as the final bonding surface. Specifically, if the thin layer of aluminum or zinc is provided on the pure copper layer, at the time of heating and pressurizing bonding, aluminum or zinc diffuses into the pure copper layer and copper or copper alloy, which is a bonded metal, and a solid solution layer is formed. As a result, the bonding strength is improved greatly.

(b) Also, conventionally, in the case where an asymmetrical and sudden thermal load is applied, even if the aluminum layer serving as a stress relaxation layer is provided, the influence of thermal load cannot be eliminated sufficiently, and in particular, there is a fear of separation at the interface between a diffusion inhibition layer and a copper bonding layer. This problem can be solved by providing a gradient composition layer consisting of an element constituting the diffusion inhibition layer and copper between the diffusion inhibition layer and the copper bonding layer.

The present invention is based on the above-described new knowledge, and the gist thereof is as follows.

1. A method of producing a bonded body of a beryllium member and a copper or copper alloy member, in which when the beryllium member and the copper or copper alloy member are bonded to each other, a thin layer of titanium, chromium, molybdenum, or silicon is formed as a diffusion inhibition layer on the surface of the beryllium; a copper layer is formed as a bonding layer on the surface of the diffusion inhibition layer; a thin layer of aluminum or zinc is successively formed as a bonding promotion layer on the surface of the bonding layer; and the beryllium member and the copper or copper alloy member are diffusion bonded to each other with the intermediate layer formation side being the bonding surface.

2. A method of producing a bonded body of a beryllium member and a copper or copper alloy member, in which when the beryllium member and the copper or copper alloy member are bonded to each other, an aluminum layer is formed as a stress relaxation layer on the surface of the beryllium; a thin layer of titanium, chromium, molybdenum, or silicon is formed as a diffusion inhibition layer for aluminum and copper; a copper layer is formed as a bonding layer on the surface of the diffusion inhibition layer; a thin layer of aluminum or zinc is successively formed as a bonding promotion layer on the surface of the bonding layer; and the beryllium member and the copper or copper alloy member are diffusion bonded to each other with the intermediate layer formation side being the bonding surface.

3. A method of producing a bonded body of a beryllium member and a copper or copper alloy member, in which when the beryllium member and the copper or copper alloy member are bonded to each other, a thin layer of titanium, chromium, molybdenum, or silicon is formed as a diffusion inhibition layer for beryllium and copper; a gradient composition layer consisting of an element constituting the diffusion inhibition layer and copper is formed; a copper layer is formed as a bonding layer on the surface of the gradient composition layer; a thin layer of aluminum or zinc is successively formed as a bonding promotion layer on the surface of the bonding layer; and the beryllium member and the copper or copper alloy member are diffusion bonded to each other with the intermediate layer formation side being the bonding surface.

4. A method of producing a bonded body of a beryllium member and a copper or copper alloy member, in which when the beryllium member and the copper or copper alloy member are bonded to each other, an aluminum layer is formed as a stress relaxation layer on the surface of the beryllium; a thin layer of titanium, chromium, molybdenum, or silicon is formed as a diffusion inhibition layer for aluminum and copper; a gradient composition layer consisting of an element constituting the diffusion inhibition layer and copper is formed; a copper layer is formed as a bonding layer on the surface of the gradient composition layer; a thin layer of aluminum or zinc is successively formed as a bonding promotion layer on the surface of the bonding layer; and the beryllium member and the copper or copper alloy member are diffusion bonded to each other with the intermediate layer formation side being the bonding surface.

5. The method of producing a bonded body of a beryllium member and a copper or copper alloy member according to any one of the above items 1 to 4, wherein a thin layer of copper is further formed as an oxidation prevention layer on the surface of the thin layer of aluminum or zinc serving as the bonding promotion layer.

6. A method of producing a bonded body of a beryllium member and a copper or copper alloy member, in which when the beryllium member and the copper or copper alloy member are bonded to each other, a thin layer of titanium, chromium, molybdenum, or silicon is formed as a diffusion inhibition layer for beryllium and copper; a gradient composition layer consisting of an element constituting the diffusion inhibition layer and copper is formed; a copper layer is formed as a bonding layer on the surface of the gradient composition layer; and the beryllium member and the copper or copper alloy member are diffusion bonded to each other with the intermediate layer formation side being the bonding surface.

7. A method of producing a bonded body of a beryllium member and a copper or copper alloy member, in which when the beryllium member and the copper or copper alloy member are bonded to each other, an aluminum layer is formed as a stress relaxation layer on the surface of the beryllium; a thin layer of titanium, chromium, molybdenum, or silicon is formed as a diffusion inhibition layer for aluminum and copper; a gradient composition layer consisting of an element constituting the diffusion inhibition layer and copper is formed; a copper layer is formed as a bonding layer on the surface of the gradient composition layer; and the beryllium member and the copper or copper alloy member are diffusion bonded to each other with the intermediate layer formation side being the bonding surface.

8. The method of producing a bonded body of a beryllium member and a copper or copper alloy member according to any one of the above items 1 to 4, wherein the thickness of the thin layer of aluminum or zinc serving as the bonding promotion layer is in the range of 0.01 to 10 µm.

9. The method of producing a bonded body of a beryllium member and a copper or copper alloy member according to the above item 5, wherein the thickness of the thin layer of copper serving as the oxidation prevention layer is in the range of 0.01 to 10 µm.

10. The method of producing a bonded body of a beryllium member and a copper or copper alloy member according to any one of the above items 1 to 9, wherein the bonding method is the hot isostatically pressing (HIP) process, and moreover the bonding conditions are a heat temperature of 400 to 650° C. and a pressure not lower than 20 MPa.

11. A bonded body of a beryllium member and a copper or copper alloy member, comprising a diffusion inhibition layer consisting of a titanium layer with a thickness of 0.5 to 50 µm, a chromium layer with a thickness of 0.1 to 5 µm, a molybdenum layer with a thickness of 0.5 to 20 µm, or a silicon layer with a thickness of 0.5 to 10 µm, a bonding layer consisting of a copper layer with a thickness of 2 to 500 µm, and a solid solution layer of aluminum or zinc and copper with a thickness of 0.1 to 100 µm, as intermediate layers between the beryllium member and the copper or copper alloy member.

12. A bonded body of a beryllium member and a copper or copper alloy member, comprising a stress relaxation layer consisting of an aluminum layer with a thickness of 5 µm to 2.5 mm, a diffusion inhibition layer consisting of a titanium layer with a thickness of 0.5 to 50 µm, a chromium layer with a thickness of 0.1 to 5 µm. a molybdenum layer with a thickness of 0.5 to 20 µm, or a siliconlayer with a thickness of 0.5 to 10 µm, a bonding layer consisting of a copper layer with a thickness of 2 to 500 µm, and a solid solution layer of aluminum or zinc and copper with a thickness of 0.1 to 100 µm, as intermediate layers between the beryllium member and the copper or copper alloy member.

13. A bonded body of a beryllium member and a copper or copper alloy member, comprising a diffusion inhibition layer consisting of a titanium layer with a thickness of 0.5 to 50 µm, a chromium layer with a thickness of 0.1 to 5 µm, a molybdenum layer with a thickness of 0.5 to 20 µm, or a silicon layer with a thickness of 0.5 to 10 µm, a gradient composition layer with a thickness of 0.1 to 100 µm, consisting of an element constituting the diffusion inhibition layer and copper, a bonding layer consisting of a copper layer with a thickness of 2 to 500 µm, and a solid solution layer of aluminum or zinc and copper with a thickness of 0.1 to 100 µm, as intermediate layers between the beryllium member and the copper or copper alloy member.

14. A bonded body of a beryllium member and a copper or copper alloy member, comprising a stress relaxation layer consisting of an aluminum layer with a thickness of 5 µm to 2.5 mm, a diffusion inhibition layer consisting of a titanium layer with a thickness of 0.5 to 50 µm, a chromium layer with a thickness of 0.1 to 5 µm, a molybdenum layer with a thickness of 0.5 to 20 µm, or a silicon layer with a thickness of 0.5 to 10 µm, a gradient composition layer with a thickness of 0.1 to 100 µm, consisting of an element constituting the diffusion inhibition layer and copper, a bonding layer consisting of a copper layer with a thickness of 2 to 500 µm, and a solid solution layer of aluminum or zinc and copper with a thickness of 0.1 to 100 µm, as intermediate layers between the beryllium member and the copper or copper alloy member.

15. A bonded body of a beryllium member and a copper or copper alloy member, comprising a diffusion inhibition layer consisting of a titanium layer with a thickness of 0.5 to 50 µm, a chromium layer with a thickness of 0.1 to 5 µm, a molybdenum layer with a thickness of 0.5 to 20 µm, or a silicon layer with a thickness of 0.5 to 10 µm, a gradient composition layer with a thickness of 0.1 to 100 µm, consisting of an element constituting the diffusion inhibition layer and copper, and a bonding layer consisting of a copper layer with a thickness of 2 to 500 µm, as intermediate layers between the beryllium member and the copper or copper alloy member.

16. A bonded body of a beryllium member and a copper or copper alloy member, comprising a stress relaxation layer consisting of an aluminum layer with a thickness of 5 µm to 2.5 mm, a diffusion inhibition layer consisting of a titanium layer with a thickness of 0.5 to 50 µm, a chromium layer with a thickness of 0.1 to 5 µm, a molybdenum layer with a thickness of 0.5 to 20 µm, or a silicon layer with a thickness of 0.5 to 10 µm, a gradient composition layer with a thickness of 0.1 to 100 µm, consisting of an element constituting the diffusion inhibition layer and copper, and a bonding layer consisting of a copper layer with a thickness of 2 to 500 µm, as intermediate layers between the beryllium member and the copper or copper alloy member.

DETAILED DESCRIPTION OF THE INVENTION

Figure 1B:
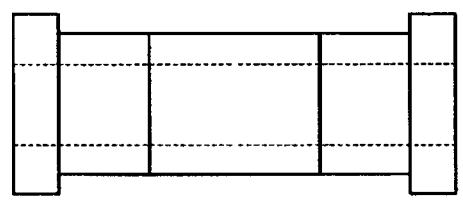
FIGS. 1A, 1B, and 1C are a front view, plan view, and side view showing the dimensions and shape of a test specimen used for a thermal load cycle test, respectively.

The present invention will now be described in detail.

In the present invention, a thin layer of titanium, chromium, molybdenum, silicon, etc. is formed on the surface of beryllium as a diffusion inhibition layer for beryllium and copper by the PVD or thermal spraying process. The thickness of the titanium, chromium, molybdenum, and silicon layer serving as the Be—Cu diffusion inhibition layer must be about 0.5 to 50 µm for titanium, 0.1 to 5 µm for chromium, 0.5 to 20 µm for molybdenum, and 0.5 to 10 µm for silicon. The reason for this is that if the thickness of each element is smaller than the lower limit value, a sufficient diffusion inhibition effect cannot be obtained, and if the thickness thereof exceeds the upper limit, the bonded body becomes brittle and may be fractured.

As the PVD process, vacuum evaporation, sputtering, ion plating, etc. are especially advantageous. It is desirable that the vacuum in the PVD treatment be not higher than $1 \times 10^{-4}$ Torr. This is because if the vacuum is higher than this value, a metallic element oxidizes, so that a satisfactory film cannot be formed. Also, in the PVD treatment, it is preferable to increase the temperature of substrate to about 200 to 400° C. from the viewpoint of the removal of organic impurities on the surface and adsorbed gas and the film adhesion due to thermal stress relaxation.

On the other hand, as the thermal spraying process, the vacuum plasma spraying (VPS) process under vacuum, the low-pressure plasma spraying (LPPS) process in a reduced-pressure inert atmosphere, or the wire thermal spraying process using an aluminum wire in the atmospheric air or in an inert atmosphere is used advantageously. When the VPS or LPPS process is employed, the cathode transfer arc cleaning process can be applied as the aforementioned method of activating the beryllium surface. This cleaning process is a process in which a voltage is applied across the plasma torch and the material to be formed with a film so as to form microscopic cathode arc spots on the surface of the material, thereby removing the oxide film on the material surface.

When the titanium, chromium, molybdenum, or silicon layer is formed as the aforementioned Be—Cu diffusion inhibition layer, in order to increase the bonding strength with the Be—Cu diffusion inhibition layer, it is advantageous to increase the activity of the beryllium surface in advance. Specifically, when the PVD process is employed as a method of forming the Be—Cu diffusion inhibition layer, it is advantageous to remove the oxide film on the beryllium surface under vacuum. As the means for removing the oxide film, argon sputtering, ion bombardment, etc. are applied advantageously. On the other hand, when the thermal spraying process is employed as a method of forming the Be—Cu diffusion inhibition layer, blast treatment is usually applied. In place of this treatment, pickling-degreasing treatment using hydrofluoric acid, sulfuric acid, nitric acid, phosphoric acid, chromic acid, etc. may be performed.

Subsequently, a copper layer is formed as a bonding layer on the surface of the aforementioned Be—Cu diffusion inhibition layer. The reason for the formation of such a copper layer is as described below. If the beryllium member would be HIP-bonded to the copper alloy member immediately after the formation of the aforementioned Be—Cu diffusion inhibition layer such as a titanium, chromium, molybdenum, or silicon thin layer, an oxide film of titanium, chromium, molybdenum, or silicon would easily be formed on the surface as soon as the beryllium member is taken out of a vacuum chamber. In the state in which such an oxide film is formed, good bonding to copper alloy cannot be anticipated. On the contrary, in the case where the copper layer is formed on the surface of the Be—Cu diffusion inhibition layer, even if an oxide film is formed on the surface after the beryllium member is taken out of a vacuum chamber, a strongly bonded body can be obtained even at a relatively low temperature of about 400 to 650° C. because copper has a sufficient affinity with the copper alloy to be bonded.

Also, since the hard metal such as titanium, chromium, molybdenum, and silicon and the copper alloy have a large difference in thermal expansion, when the temperature rises during the use of the bonded body, separation may occur at the interface due to the difference in thermal expansion. However, if the copper layer is interposed between the hard metal and the copper alloy, the copper layer effectively relaxes the stress occurring due to the difference in thermal expansion and effectively prevents the occurrence of separation. If the thickness of the copper layer is smaller than 2 $\mu$m, the film forming effect is little. On the other hand, if the thickness thereof exceeds 500 $\mu$m, the time taken for forming the film becomes long, which is disadvantageous in terms of economy. Therefore, the thickness of the copper alloy was limited to the range of 2 to 500 $\mu$m. Also, as a method of forming the copper layer, as in the case where the diffusion inhibition layer is formed, the PVD process, the thermal spraying process, etc. are applied advantageously.

Further, an aluminum or zinc thin layer is formed as a bonding promotion layer on the surface of the copper layer serving as a bonding layer. The reason for this is that if the aluminum or zinc thin layer is formed on the surface of the copper layer as described above, aluminum or zinc diffuses into the pure copper layer and copper or copper alloy to be bonded and forms a solid solution layer at the time of subsequent heating and pressurizing bonding, by which the bonding strength is further increased. The thickness of the aluminum or zinc thin layer serving as the bonding promotion layer must be 0.01 to 10 $\mu$m. The reason for this is as described below. If the thickness is smaller than the lower limit value, an effect as the bonding promotion layer cannot be achieved. On the other hand, the thickness exceeds the upper limit, the diffusion of aluminum or zinc is not effected sufficiently at the time of heating bonding, so that Cu—Al based or Cu—Zn based intermetallic compound remains at the bonding interface, by which the bonded body becomes brittle and may be fractured.

In the present invention, it is advantageous to further form a copper thin layer as an oxidation prevention layer on the aforementioned aluminum or zinc thin layer serving as the bonding promotion layer.

The reason for this is as described below. Since the aforementioned aluminum or zinc thin layer is oxidized very easily, if copper or copper alloy would be bonded in the state in which such an oxide film has been formed, in some cases, good bonding could not be performed steadily depending on the degree of oxidation of the surface of the aluminum or zinc thin layer. In this respect, if the copper thin layer is formed as the oxidation prevention layer on the surface of the aluminum or zinc thin layer, the above-described problem does not arise.

The thickness of the aforementioned copper thin layer serving as the oxidation prevention layer must be 0.01 to 10 $\mu$m. The reason for this is as described below. If the thickness is smaller than the lower limit value, an effect as the oxidation prevention layer is little. On the other hand, if the thickness exceeds the upper limit, a distance from the aluminum or zinc thin layer to the bonding interface increases, and thus aluminum or zinc cannot be diffused sufficiently to the bonding interface even by the heating at the time of bonding, so that the mutual diffusion of metal atoms at the bonding interface is insufficient, resulting in a decrease in strength.

As a method of forming the aforementioned aluminum or zinc thin layer and copper thin layer, as in the case of the diffusion inhibition layer and the copper bonding layer, the PVD process, the thermal spraying process, etc. are applied advantageously.

Next, the beryllium member and the copper or copper alloy member are bonded to each other with the intermediate layer formation side being the bonding surface. As a bonding method, HIP-bonding is best suitable. In the HIP-bonding, the bonding temperature can be made about 400 to 650° C., which is lower than the conventional bonding temperature, and the pressure should preferably be at least 20 MPa. Regarding the pressure, the optimum pressure is selected from the range of not lower than 20 MPa depending on the roughness and shape of bonding surface, the structure of canning, etc. Generally, an excessive pressure brings about an increase in cost of pressure gas, power for pressurizing, and HIP facility withstanding the pressure. Therefore, the upper limit of pressure is determined spontaneously. By the aforementioned HIP-bonding, a solid solution layer of aluminum or zinc and copper with a thickness of 0.1 to 100 $\mu$m is formed between the copper bonding layer and the copper or copper alloy.

Thus, there can be obtained steadily a HIP-bonded body of beryllium and copper alloy having high bonding strength and thermal cycle resistance property without the formation of a brittle compound at the interface not only at the time of HIP bonding but also at the time of use.

However, since beryllium and hard metal such as titanium, chromium, molybdenum, and silicon have a large difference in thermal expansion, in an application in which the temperature rises excessively at the time of use, separation may occur at the interface due to this difference in thermal expansion. In this case, it is advantageous to form an aluminum layer as a stress relaxation layer between the beryllium and the hard metal. This is because aluminum is soft so that it is very useful for relaxing the stress, and also contributes effectively as the diffusion inhibition layer for beryllium and copper. The aluminum layer serving as the stress relaxation layer is not limited to pure aluminum. An aluminum alloy having high-temperature strength such as A2618 can be used. The use of such an aluminum alloy is especially advantageous when the bonded body is used at high temperatures.

On the other hand, for a first wall of a nuclear fusion reactor, at the time of accident producing a dangerous thermal load due to abnormal plasma, beryllium armor is sometimes required to be separated rather spontaneously from copper or copper alloy for the sake of safety. When the bonding method and bonded body in accordance with the present invention are used, beryllium can be separated by spontaneous melting of the aluminum layer due to thermal load. Moreover, by using an aluminum alloy having a proper melting point as the aluminum layer, the condition in which beryllium separates can be selected appropriately.

When the aluminum layer is formed, prior to the formation of a hard metal such as titanium, chromium, molybdenum, and silicon, it is preferable that the aluminum layer be formed on the activated surface of beryllium from which oxide film is removed by similarly using the PVD or thermal spraying process. The film thickness must be at least 5 $\mu$m. However, in the case where the bonded body is used in an application in which an excessive thermal load is applied repeatedly, the film thickness should preferably be 200 $\mu$m or larger. Nevertheless, even if the film thickness exceeds 2.5 mm, the thermal stress relaxation effect saturates, and the time taken for the formation of film rather becomes excessively long, which suffers economical disadvantage. Therefore, the thickness of the aluminum layer serving as the stress relaxation layer was limited to the range of 5 $\mu$m to 2.5 mm. An especially preferable thickness of the aluminum layer is in the range of 0.5 to 1.5 mm.

In order to form the aluminum layer with a thickness of 200 $\mu$m or larger by the PVD process, not only much time is required but also the apparatus inevitably becomes complicated and large, which is advantageous in terms of cost. Also, the film with a thickness of 500 $\mu$m or larger cannot practically be formed.

Therefore, when the aluminum layer with a thickness of 200 $\mu$m or larger is formed, it is advantageous to use the thermal spraying process. When the aluminum layer is formed on the surface of beryllium member by the thermal spraying process such as the VPS or LPPS process, it is necessary only that aluminum powder be used, and it be sprayed on the beryllium member while being melted by plasma.

When a thin layer of titanium, chromium, molybdenum, silicon, etc. is successively formed by the VPS or LPPS process, the thermal sprayed film can be formed continuously by changing the powder. When the copper layer and the aluminum or zinc layer are further formed on the thin layer of hard metal, the film can be formed continuously in the same way. In this case, after the thermal spraying of one kind of layer has been finished, the thermal spraying of the next layer may be performed after the surface of layer is cleaned by the aforementioned cathode transfer arc process.

Also, in the case where the aluminum layer has been formed by the wire thermal spraying process, when the subsequent formation of the titanium, chromium, molybdenum, or silicon layer and further the formation of the copper layer and the aluminum or zinc layer over the hard metal layer are effected similarly by using the thermal spraying process, the VPS or LPPS process must be employed. In this case, the thermal sprayed surface of aluminum must be cleaned by any kind of the aforementioned treatment, and fume, oxides, etc. on the surface must be removed.

Further, since the surface of thermal sprayed film is generally rough, it is preferable that the formation of the titanium, chromium, molybdenum, or silicon layer and further the formation of the copper layer and the aluminum or zinc layer over the hard metal layer be effected after the surface of aluminum layer having been thermal sprayed has been smoothened by machining or grinding and cleaned. At this time, the formation of the titanium, chromium, molybdenum, or silicon layer and the formation of the copper layer may be effected by either the thermal spraying process or the PVD process.

Even if the aforementioned aluminum layer is provided as the stress relaxation layer, when an asymmetrical and sudden thermal load is applied, the bonding of the diffusion inhibition layer and the copper layer cannot withstand a concentrated shearing stress generated at the interface therebetween due to the difference in thermal expansion between the diffusion inhibition layer and the copper layer made by the influence of thermal load. Therefore, separation sometimes occurs at the interface between the diffusion inhibition layer and the copper layer. However, this problem can be solved by providing a gradient composition layer consisting of an element constituting the diffusion inhibition layer and copper between the diffusion inhibition layer and the copper bonding layer. Specifically, if the aforementioned gradient composition layer is provided between the diffusion inhibition layer and the copper bonding layer, even if an asymmetrical and sudden thermal load is applied, a gradual change in thermal expansion is attained in the gradient composition layer. Therefore, the shearing force decreases, so that the separation at the interface between the diffusion inhibition layer and the copper boding layer is prevented effectively.

For example, in the case where the PVC process is used, by changing each film forming rate while the films of the diffusion inhibition layer constituting element and copper are formed simultaneously or alternately, the aforementioned gradient composition layer can have a gradient composition such that the copper ratio in unit volume increases continuously toward the surface side. Also, in the case where the thermal spraying process is used, when the films of the diffusion inhibition layer constituting element and copper are formed alternately, the gradient composition can be made by appropriately changing the thickness thereof. The thickness of the aforementioned gradient composition layer must be in the range of 0.1 to 100 $\mu$m. The reason for this is as described below. If the thickness is smaller than the lower limit value, a sufficiently gradual change in thermal expansion cannot be attained in the gradient composition layer, so that the effect of decreasing the shearing stress is insufficient. On the other hand, if the thickness exceeds the upper limit, the effect of decreasing the shearing stress saturates, and the thickness exceeding the upper limit brings about an unnecessary increase in time required for film formation and cost.

In the case where the aforementioned gradient composition layer is formed, the formation of the aluminum or zinc thin layer serving as the bonding promotion layer can be omitted depending on the kind of copper alloy bonded to beryllium. The reason for this is as described below. For example, when a copper alloy such as chrome zirconium copper is used, an alloy compound (chromium, zirconium, etc.) diffuses into the copper bonding layer, which is an opposed surface, at the time of bonding, so that the bonding in this portion can become strong. However, if an asymmetrical and sudden thermal load is applied to such a bonded body, the aforementioned separation between the diffusion inhibition layer and the copper bonding layer poses a problem when the gradient composition layer does not exist, while the bonded body having the gradient composition layer can realize strong bonding as a whole.

Thereupon, after the aluminum layer is formed on the surface of beryllium, the titanium, chromium, molybdenum, or silicon layer is formed. Then, after the gradient composition layer is formed, the copper layer is formed successively, and the aluminum or zinc thin layer is further formed. Thus, aluminum—(titanium, chromium, molybdenum, silicon)—gradient layer—copper—(aluminum, zinc) layer are formed as the intermediate layers, by which a bonded body having remarkably excellent stress relaxation capacity and bonding strength can be obtained.

As the copper alloy used in the present invention, alumina dispersion strengthened copper (DSCu), chrome zirconium copper, and beryllium copper (JIS C17510 etc.) are advantageous. Especially when a precipitation-hardened copper alloy subjected to solution heat treatment before bonding is used as the copper alloy, at the time of bonding, in addition to the driving force of diffusion due to concentration gradient of the precipitation-hardened copper alloy and the copper bonding layer opposed to this copper alloy, the driving force of diffusion at the time when a deposit element forming supersaturated solid solution in the precipitation-hardened copper alloy begins to deposit is added, by which strong bonding can be attained by promoted diffusion at the bonding interface. Also, after bonding, the precipitation-hardened copper alloy becomes in an age-deposited state, and the increase in strength of copper alloy can also be advantageously attained. Also, with the bonding method in accordance with the present invention, beryllium can be strongly bonded to copper or copper alloy by forming various kinds of intermediate layers on the bonding surface on the beryllium side only. Therefore, in the case where the bonding method in accordance with the present invention is applied to the first wall of nuclear fusion reactor, a film forming process on the copper alloy member, which is a large structure, by the PVD process etc. is unnecessary except for the film formation on the beryllium member, which is relatively small. Therefore, the film thickness control in a large area and a large-sized film forming apparatus are not needed advantageously.

EXAMPLE 1

As specimens, beryllium, oxygen free copper, and various kinds of copper alloys (alumina dispersion strengthened copper alloy (DSCu), chrome zirconium copper (CuCrZr)), each measuring 25 mm W×25 mm L×11 mm t, were used. As the chrome zirconium copper (CuCrZr), a material which was heated at 980° C. for 30 minutes and then water cooled and was subjected to solution heat treatment was used. Except that the copper bonding layer of No. 26 was formed on the surface of 25 mm×25 mm of beryllium under the conditions given in Table 1 by the thermal spraying process, all of various intermediate layers were formed by the PVD process. Then, the beryllium was put into a stainless steel made vessel together with copper or various copper alloys, and HIP bonding was performed under the conditions similarly given in Table 1 with the intermediate layer side being the bonding surface. A bending test piece measuring 3 mm×3 mm×22 mm with the bonding interface being the center was cut out of each HIP-bonded body obtained as described above by electrical discharge machining. After being ground, the bending test piece was subjected to bending test. This bending test was conducted according to "Testing Method for Bending Strength of Fine Ceramic Joint" specified in JIS R1624(1995), and the "joint bending strength" was measured. The obtained results are also given in Table 1.

TABLE 1

| | bending strength (MPa) | | | | | intermediate layer formed between beryllium and copper or copper alloy | | |
| --- | --- | --- | --- | --- | --- | --- | --- | --- |
| spec. No. | strength 1 | strength 2 | strength 3 | average | σ | diffusion inhibition layer | gradient composition layer | Cu bonding layer |
| 1 | 125 | 101 | 145 | 124 | 22 | Cr (1 μm) | — | Cu (10 μm) |
| 2 | 258 | 243 | 263 | 255 | 10 | Cr (1 μm) | — | Cu (10 μm) |
| 3 | 110 | 138 | 83 | 110 | 28 | Cr (1 μm) | — | Cu (10 μm) |
| 4 | 298 | 245 | 326 | 290 | 41 | Cr (1 μm) | — | Cu (10 μm) |
| 5 | 308 | 314 | 270 | 297 | 24 | Cr (1 μm) | — | Cu (10 μm) |
| 6 | 167 | 132 | 128 | 142 | 21 | Cr (1 μm) | — | Cu (10 μm) |
| 7 | 320 | 334 | 297 | 317 | 19 | Cr (1 μm) | — | Cu (10 μm) |
| 8 | 271 | 324 | 282 | 292 | 28 | Cr (1 μm) | — | Cu (10 μm) |
| 9 | 324 | 308 | 317 | 316 | 8 | Cr (1 μm) | — | Cu (10 μm) |
| 10 | 301 | 295 | 288 | 295 | 7 | Cr (1 μm) | — | Cu (10 μm) |
| 11 | 112 | 129 | 97 | 113 | 16 | Cr (1 μm) | — | Cu (10 μm) |
| 12 | 430 | 424 | 418 | 424 | 6 | Cr (1 μm) | CrCu (1 μm) | Cu (10 μm) |
| 13 | 488 | 475 | 472 | 478 | 9 | Cr (1 μm) | CrCu (1 μm) | Cu (10 μm) |
| 14 | 289 | 264 | 258 | 270 | 16 | Cr (1 μm) | CrCu (50 nm) | Cu (10 μm) |

TABLE 1-continued

| | | | | | | | | |
|---|---|---|---|---|---|---|---|---|
| 15 | 483 | 499 | 512 | 498 | 15 | Cr (1 μm) | CrCu (1 μm) | Cu (10 μm) |
| 16 | 320 | 374 | 332 | 342 | 28 | Cr (1 μm) | CrCu (50 μm) | Cu (10 μm) |
| 17 | 135 | 155 | 127 | 139 | 14 | Cr (1 μm) | CrCu (200 μm) | Cu (10 μm) |
| 18 | 231 | 252 | 238 | 240 | 11 | Cr (50 nm) | CrCu (1 μm) | Cu (10 μm) |
| 19 | 411 | 402 | 423 | 412 | 11 | Cr (0.5 μm) | CrCu (1 μm) | Cu (10 μm) |
| 20 | 508 | 515 | 497 | 507 | 9 | Cr (1 μm) | CrCu (1 μm) | Cu (10 μm) |
| 21 | 482 | 530 | 512 | 508 | 24 | Cr (4 μm) | CrCu (1 μm) | Cu (10 μm) |
| 22 | 187 | 182 | 174 | 181 | 7 | Cr (10 μm) | CrCu (1 μm) | Cu (10 μm) |
| 23 | 247 | 230 | 253 | 243 | 12 | Cr (1 μm) | CrCu (1 μm) | Cu (0.5 μm) |
| 24 | 503 | 483 | 487 | 491 | 11 | Cr (1 μm) | CrCu (1 μm) | Cu (5 μm) |
| 25 | 451 | 467 | 440 | 453 | 14 | Cr (1 μm) | CrCu (1 μm) | Cu (300 μm) |
| 26 | 152 | 180 | 158 | 163 | 15 | Cr (1 μm) | CrCu (1 μm) | Cu (700 μm) |
| 27 | 352 | 347 | 371 | 357 | 13 | Ti (10 μm) | TiCu (1 μm) | Cu (10 μm) |
| 28 | 481 | 507 | 501 | 496 | 14 | Mo (5 μm) | MoCu (1 μm) | Cu (10 μm) |
| 29 | N/B[1] | N/B[1] | N/B[1] | N/B[1] | N/B[1] | Cr (1 μm) | CrCu (1 μm) | Cu (10 μm) |
| 30 | 308 | 280 | 330 | 306 | 25 | Cr (1 μm) | CrCu (1 μm) | Cu (10 μm) |
| 31 | 405 | 397 | 412 | 405 | 8 | Cr (1 μm) | CrCu (1 μm) | Cu (10 μm) |
| 32 | 521 | 566 | 534 | 540 | 23 | Cr (1 μm) | CrCu (1 μm) | Cu (10 μm) |
| 33 | 525 | 537 | 497 | 520 | 21 | Cr (1 μm) | CrCu (1 μm) | Cu (10 μm) |
| 34 | 115 | 43 | 87 | 82 | 36 | Cr (1 μm) | CrCu (1 μm) | Cu (10 μm) |
| 35 | 395 | 360 | 371 | 375 | 18 | Cr (1 μm) | CrCu (1 μm) | Cu (10 μm) |
| 36 | 423 | 417 | 421 | 420 | 3 | Cr (1 μm) | CrCu (1 μm) | Cu (10 μm) |

| | intermediate layer formed between beryllium and copper or copper alloy | | | | HIP conditions | | |
|---|---|---|---|---|---|---|---|
| spec. No. | bonding promotion layer | oxidation prevention layer | copper or copper alloy | solid solution layer | temperature (° C.) | pressure (MPa) | remarks (examples) |
| 1 | — | — | DSCu | — | 610 | 150 | conventional |
| 2 | — | — | CuCrZr | — | 610 | 150 | conventional |
| 3 | Al (5 nm) | — | DSCu | 0.08 μm | 610 | 150 | comparative |
| 4 | Al (0.3 μm) | — | DSCu | 10 μm | 610 | 150 | invention |
| 5 | Al (5 μm) | — | DSCu | 90 μm | 610 | 150 | invention |
| 6 | Al (50 μm) | — | DSCu | 500 μm | 610 | 150 | comparative |
| 7 | Zn (1 μm) | — | DSCu | 50 μm | 610 | 150 | invention |
| 8 | Al (0.3 μm) | Cu (5 nm) | DSCu | 10 μm | 610 | 150 | invention |
| 9 | Al (0.3 μm) | Cu (0.3 μm) | DSCu | 10 μm | 610 | 150 | invention |
| 10 | Al (0.3 μm) | Cu (5 μm) | DSCu | 10 μm | 610 | 150 | invention |
| 11 | Al (0.3 μm) | Cu (50 μm) | DSCu | 10 μm | 610 | 150 | comparative |
| 12 | Al (0.3 μm) | Cu (0.3 μm) | DSCu | 10 μm | 610 | 150 | invention |
| 13 | Zn (1 μm) | Cu (0.3 μm) | OFC[2] | 50 μm | 610 | 150 | invention |
| 14 | — | — | CuCrZr | — | 580 | 150 | comparative |
| 15 | — | — | CuCrZr | — | 580 | 150 | invention |
| 16 | — | — | CuCrZr | — | 580 | 150 | invention |
| 17 | — | — | CuCrZr | — | 580 | 150 | comparative |
| 18 | — | — | CuCrZr | — | 550 | 150 | comparative |
| 19 | — | — | CuCrZr | — | 550 | 150 | invention |
| 20 | — | — | CuCrZr | — | 550 | 150 | invention |
| 21 | — | — | CuCrZr | — | 550 | 150 | invention |
| 22 | — | — | CuCrZr | — | 550 | 150 | comparative |
| 23 | — | — | CuCrZr | — | 550 | 150 | comparative |
| 24 | — | — | CuCrZr | — | 550 | 150 | invention |
| 25 | — | — | CuCrZr | — | 550 | 150 | invention |
| 26 | — | — | CuCrZr | — | 550 | 150 | comparative |
| 27 | — | — | CuCrZr | — | 610 | 150 | invention |
| 28 | — | — | CuCrZr | — | 610 | 150 | invention |
| 29 | — | — | CuCrZr | — | 350 | 150 | comparative Hv145 |
| 30 | — | — | CuCrZr | — | 450 | 150 | invention Hv160 |
| 31 | — | — | CuCrZr | — | 520 | 150 | invention Hv130 |
| 32 | — | — | CuCrZr | — | 610 | 150 | invention Hv95 |
| 33 | — | — | CuCrZr | — | 700 | 150 | invention Hv80 |
| 34 | — | — | CuCrZr | — | 520 | 10 | comparative |
| 35 | — | — | CuCrZr | — | 520 | 50 | invention |
| 36 | — | — | CuCrZr | — | 520 | 190 | invention |

[1]N/B: Not bonded
[2]OFC: oxygen free copper

As shown in Table 1, for all of the HIP-bonded bodies obtained in accordance with the present invention, a brittle intermetallic compound was not formed at the interface, so that a high bending strength could be obtained. In these application examples, assuming the actual use at high temperatures, the bending test at 200 to 400° C. was also conducted. The result was that the joint bending strength decreased little, and was in the range in which the bonded body can be used practically.

Conventionally, when a copper-based material in which an alloy component scarcely exists as a metal, such as oxygen free copper and DSCu, is bonded to the copper bonding layer formed on the beryllium surface at a relatively low temperature, the bonding in this portion has been insufficient. However, by farming the aluminum or zinc thin layer as the bonding promotion layer in accordance with the present invention, bonding with a high bonding strength could be realized. Further, the result was obtained such that the joint bending strength of bonded body in which the oxidation prevention layer was formed on the bonding promotion layer had less varied and stable test result as compared with the bonded body in which the oxidation prevention layer was not formed.

On the other hand, in the case of copper alloy in which an alloy component exists as a metal, such as CuCrZr, in the conventional bonded body having no gradient composition layer, the interface between the diffusion inhibition layer and the copper bonding layer has been most brittle. However, in the bonded body in which the gradient composition layer was formed between the diffusion inhibition layer and the copper bonding layer in accordance with the present invention, the joint bending strength was increased significantly.

When the precipitation-hardened alloy such as CuCrZr is used, age-deposition at the time of HIP bonding as in this case is desirable in terms of process. However, if the HIP temperature is too high, overaging occurs, and as shown in No. 33, the hardness (strength) of CuCrZr is sometimes decreased. Care should be given to this respect.

Also, if, as shown in Nos. 29 and 34, the temperature or pressure at the time of HIP bonding is too low, the diffusion at the bonding interface between beryllium and copper alloy becomes insufficient, so that the bonding strength is remarkably decreased. Therefore, excessively low temperature and pressure are undesirable.

EXAMPLE 2

Figure 1A:
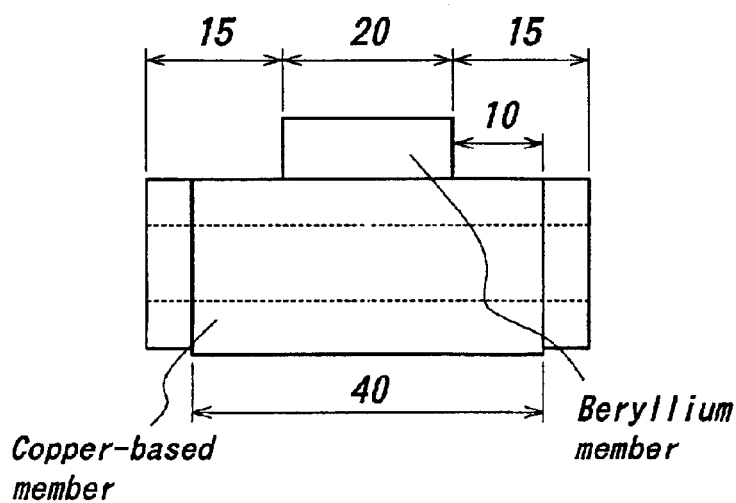
Figure 1C:
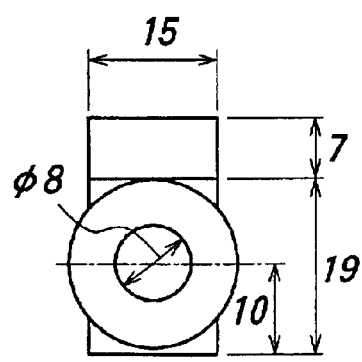

As specimens, beryllium measuring 15 mm W×20 mm L×7 mm t and oxygen free copper and various copper alloys (alumina dispersion strengthened copper alloy (DSCu), chrome zirconium copper (CuCrZr)) measuring 18 mm W×50 mm L×20 mm t were used. As the chrome zirconium copper (CuCrZr), a material which was subjected to solution heat treatment as in Example 1 was used. Except that the stress relaxation layers of Nos. 3 to 10 were formed on the surface of 15 mm×20 mm of beryllium under the conditions given in Table 2 by the thermal spraying process, all of various intermediate layers were formed by the PVD process. Then, the copper or various copper alloys were put into a stainless steel made vessel, and HIP bonding was performed under the conditions similarly given in Table 2 with the intermediate layer side being the bonding surface. From each HIP-bonded body obtained as described above, a test specimen for thermal load cycle test, which is formed with a hole for cooling water in a copper-based material portion as shown in FIG. 1, was produced.

The test specimen for thermal load cycle test was set in a vacuum vessel in which a vacuum is maintained in the surroundings of the test specimen while cooling water of about 30° C. was allowed to flow through the cooling water hole formed in the copper-based material portion of the test specimen. The thermal load was applied by scanning the surface of beryllium in a rectangular form at a high speed using an electron beam. Also, the thermal load cycle was realized by repeating a process in which after the scanning position of electron beam was moved from the beryllium surface of test specimen to a heat absorbing device provided in a position other than the test specimen, the scanning position was moved again to the beryllium surface, while keeping the electron beam at each position for a fixed time. During the thermal load cycle test, the surface of beryllium was always monitored using an infrared camera. When the surface temperature or the distribution thereof of beryllium changed remarkably from the initial state of test, this was regarded as abnormality of bonding portion of test specimen, and the test was stopped. The thermal load cycle given to the test specimen up to this time was taken as the life (thermal load number) of test specimen, which was used as a comparison evaluation item of bonding conditions. A bending test piece was also produced by the same procedure as that of Example 1, and the joint bending strength of each bonded body was measured. The results thus obtained are also given in Table 2.

TABLE 2

| specimen No. | bending strength (MPa) | | | | thermal load number (times) | intermediate layer formed between beryllium and copper or copper alloy | | |
|---|---|---|---|---|---|---|---|---|
| | strength 1 | strength 2 | strength 3 | average | | stress relaxation layer | diffusion inhibition layer | gradient composition layer |
| 1 | 278 | 264 | 245 | 262 | 1140 | Al (2 μm) | Ti (10 μm) | TiCu (1 μm) |
| 2 | 235 | 241 | 228 | 235 | >2000 | Al (10 μm) | Ti (10 μm) | TiCu (1 μm) |
| 3 | 192 | 187 | 197 | 192 | >2000 | Al (1 mm) | Ti (10 μm) | TiCu (1 μm) |
| 4 | 176 | 165 | 178 | 173 | 885 | Al (5 mm) | Ti (10 μm) | TiCu (1 μm) |
| 5 | 207 | 194 | 189 | 197 | >2000 | Al (1 mm) | Ti (10 μm) | TiCu (1 μm) |
| 6 | 181 | 194 | 186 | 187 | 1930 | Al (1 mm) | Ti (10 μm) | — |
| 7 | 195 | 188 | 201 | 195 | 1860 | Al (1 mm) | Cr (1 μm) | — |
| 8 | 183 | 202 | 184 | 190 | >2000 | Al (1 mm) | Ti (10 μm) | TiCu (1 μm) |
| 9 | 209 | 194 | 198 | 200 | >2000 | Al (1 mm) | Cr (1 μm) | CrCu (1 μm) |
| 10 | 134 | 102 | 126 | 121 | 560 | Al (1 mm) | Ti (10 μm) | — |

TABLE 2-continued

| specimen No. | intermediate layer formed between beryllium and copper or copper alloy | | copper or copper alloy | solid solution layer | HIP conditions | | remarks |
|---|---|---|---|---|---|---|---|
| | Cu bonding layer | bonding promotion layer | | | temperature (° C.) | pressure (MPa) | |
| 1 | Cu (10 μm) | Al(0.3 μm) | DSCu | 10 μm | 610 | 150 | comparative example |
| 2 | Cu (10 μm) | Al(0.3 μm) | DSCu | 10 μm | 610 | 150 | invention example |
| 3 | Cu (10 μm) | Al(0.3 μm) | DSCu | 10 μm | 610 | 150 | invention example |
| 4 | Cu (10 μm) | Al(0.3 μm) | DSCu | 10 μm | 610 | 150 | comparative example |
| 5 | Cu (10 μm) | Al(0.3 μm) | oxygen free copper | 10 μm | 610 | 150 | invention example |
| 6 | Cu (10 μm) | Al(0.3 μm) | DSCu | 10 μm | 610 | 150 | invention example |
| 7 | Cu (10 μm) | Al(0.3 μm) | DSCu | 10 μm | 610 | 150 | invention example |
| 8 | Cu (10 μm) | — | CuCrZr | — | 610 | 150 | invention example |
| 9 | Cu (10 μm) | — | CuCrZr | — | 610 | 150 | invention example |
| 10 | Cu (10 μm) | — | DSCu | — | 610 | 150 | conventional example |

As shown in Table 2, even if an asymmetrical and sudden thermal load is applied from the beryllium side only, the bonded body in accordance with the present invention could withstand more thermal load cycles than the conventional bonded body owing to the functions of the bonding promotion layer and gradient composition layer, which further increased the strength, as well as the stress relaxation layer.

As described above, according to the present invention, there can be obtained a bonded body of a beryllium member and a copper or copper alloy member, in which a brittle compound is not yielded at the interface not only at the time of HIP bonding but also at the time of use, and even if an asymmetrical and sudden thermal load is applied, high bonding strength and thermal cycle resistance property are provided.

What is claimed is:

1. A bonded body of a beryllium member bonded to a copper or copper alloy member through a plurality of layers, comprising a diffusion inhibition layer consisting of a thin titanium, chromium, molybdenum or silicon layer, a bonding layer consisting of a thin copper layer, and a solid solution layer of aluminum or zinc and copper, said diffusion inhibition layer, said bonding layer and said solid solution layer being arranged in the stated sequence as seen in a direction from said beryllium member to said copper or copper alloy member, wherein said titanium layer is formed prior to bonding to have a thickness of 0.5 to 50 μm, said chromium layer is formed prior to bonding to have a thickness of 0.1 to 5 μm, said molybdenum layer is formed prior to bonding to have a thickness of 0.5 to 20 μm, said silicon layer is formed prior to bonding to have a thickness of 0.5 to 10 μm, said bonding layer is formed prior to bonding to have a thickness of 2 to 500 μm, and said solid solution layer, after bonding, has a thickness of 0.1 to 100 μm.

2. A bonded body according to claim 1, further comprising a stress relaxation layer consisting of a thin aluminum layer, said stress relaxation layer being arranged between said beryllium member and said diffusion inhibition layer.

3. A bonded body according to claim 2, wherein said stress relaxation layer is formed prior to bonding to have a thickness of 5 μm to 2.5 mm.

4. A bonded body according to claim 1, further comprising a gradient composition layer consisting of an element constituting said diffusion inhibition layer and copper, said gradient composition layer being arranged between said diffusion inhibition layer and said bonding layer.

5. A bonded body according to claim 4, wherein said gradient composition layer is formed prior to bonding to have a thickness of 0.1 to 100 μm.

6. A bonded body according to claim 1, further comprising a stress relaxation layer consisting of a thin aluminum layer, said stress relaxation layer being arranged between said beryllium member and said diffusion inhibition layer, and a gradient composition layer consisting of an element constituting said diffusion inhibition layer and copper, said gradient composition layer being arranged between said diffusion inhibition layer and said bonding layer.

7. A bonded body according to claim 6, wherein said stress relaxation layer is formed prior to bonding to have a thickness of 5 μm to 2.5 mm, and said gradient composition layer is formed prior to bonding to have a thickness of 0.1 to 100 μm.

* * * * *